United States Patent [19]
Sharp et al.

[11] 3,831,346
[45] Aug. 27, 1974

[54] METHOD FOR DEHYDRATION OF WET GASES

[75] Inventors: Shelby P. Sharp; Lamar F. Sudduth, both of Tulsa, Okla.

[73] Assignee: Amoco Production Company, Tulsa, Okla.

[22] Filed: May 9, 1973

[21] Appl. No.: 358,785

[52] U.S. Cl. .................. 55/32, 210/21, 260/615 B, 260/637 R
[51] Int. Cl. ........................ B01d 53/4, C07c 29/24
[58] Field of Search ................ 55/30–32, 171–177; 159/31; 210/21; 260/615 B, 637 R, 643 D

[56] References Cited
UNITED STATES PATENTS 3,099,692  7/1963  Owen et al. ........................ 260/637
3,707,065  12/1972  Muller et al. ........................... 55/32

*Primary Examiner*—Charles N. Hart
*Attorney, Agent, or Firm*—Paul F. Hawley; Arthur McIlroy

[57] ABSTRACT

Absorbent solutions used to dehydrate wet gases tend to accumulate objectionable amounts of heavy hydrocarbons that cannot be removed by usual regeneration methods. Ultimately the absorbent becomes ineffective for water removal. This invention employs a selective solvent such as $CS_2$ or $CCl_4$ to remove hydrocarbons from the absorbent and the latter can then be recirculated to the dehydration system as an effective drying agent.

12 Claims, 1 Drawing Figure

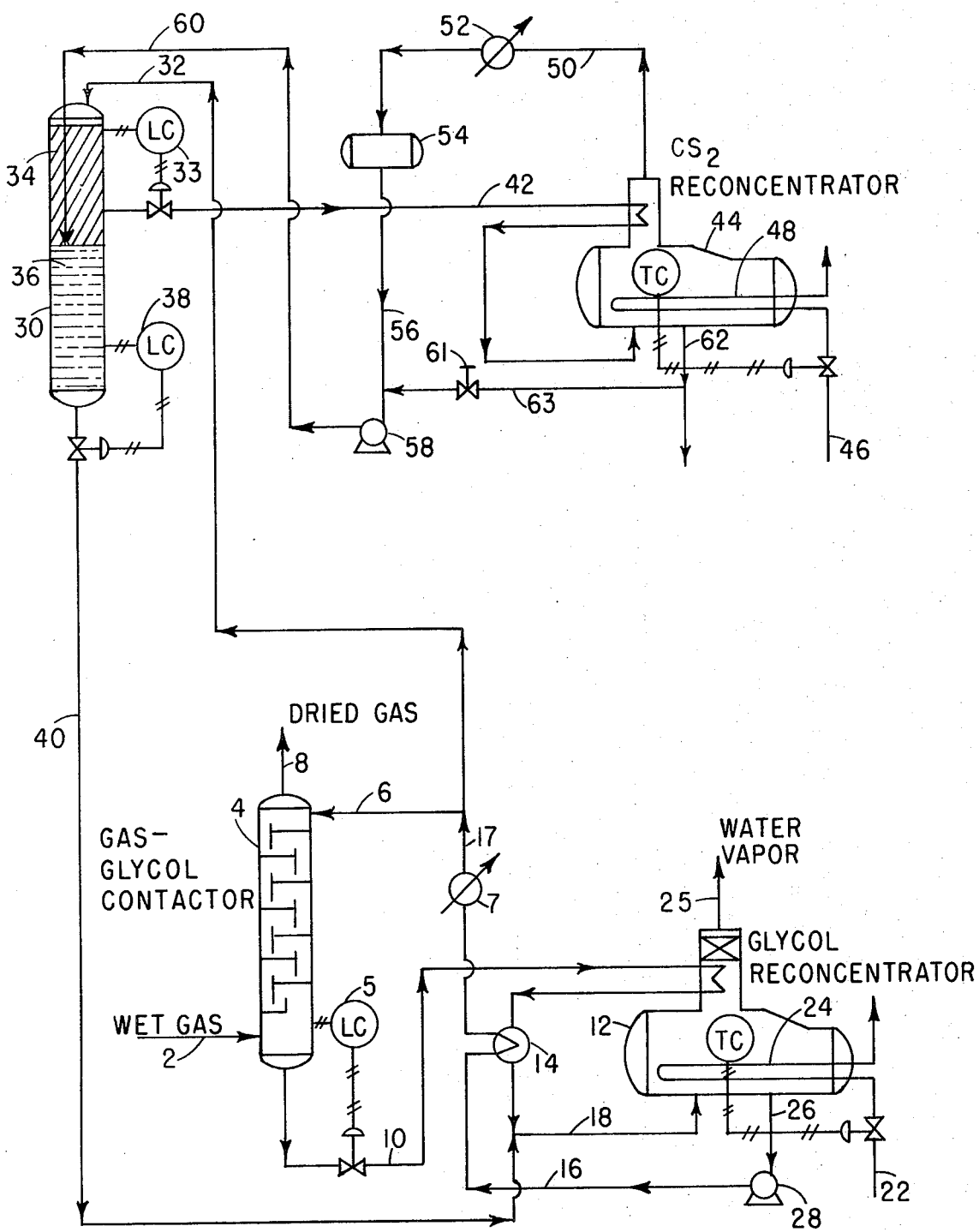

METHOD FOR DEHYDRATION OF WET GASES

The present invention is concerned with a procedure for purifying the liquid absorbent used in the dehydration of a wet gas. More particularly, it relates to a novel procedure for extracting impurities from said absorbent so that the latter can more effectively perform its primary function of gas dehydration.

BACKGROUND OF INVENTION

In the dehydration of gas streams, such as natural gas, the liquid absorbent, e.g., a glycol such as ethylene glycol, dietheylene glycol or triethylene glycol, tends to also absorb hydrocarbons. Water is removed from the rich glycol solvent by heating and the lean glycol recirculated. The lighter hydrocarbons are removed, along with the water during the regeneration step; however, after a period of time a fraction of heavy hydrocarbons, e.g., $C_{10}$ and heavier, collect in the circulating glycol. This accumulation of heavy hydrocarbons continues until a concentration is reached which renders the absorbent ineffective for dehydration of wet gas, typically from about 15 to 18 percent. The contaminated absorbent must then be replaced with a new charge.

One gasoline plant of which we are aware has two glycol dehydrator systems for drying inlet gas, with each system containing 2,500 gallons of glycol. The latter is replaced in each of these units at least twice a year. The cost of replacing the glycol in the two units each time is approximately 6,000 dollars. Analysis of glycol samples from this plant gave the following results.

TABLE I

| | Weight Percent | |
|---|---|---|
| | Total Hydrocarbon | Triethylene Glycol Plus Water |
| No. 1 Dehydrator Rich | 16.6 | 83.4 |
| No. 1 Dehydrator Lean | 8.3 | 91.7 |
| No. Dehydrator Rich | 22.2 | 77.8 |
| No. 2 Dehydrator Lean | 17.8 | 82.2 |

The above results show that the circulating glycol solution contains heavy hydrocarbons which are not rejected in the regeneration cycle. The heavy hydrocarbon content of the glycol increases with time and this is accompanied by a corresponding decrease in the ability of the glycol to take up water.

BRIEF DESCRIPTION OF THE INVENTION

We have now discovered a novel procedure for maintaining the absorbent used in the gas drying step, free from objectionable amounts of higher hydrocarbons. Specifically, the hydrocarbon component remaining in the absorbent after the regeneration step can be selectively extracted by the use of $CS_2$ or $CCl_4$. To demonstrate the efficiency of these solvents we have conducted laboratory tests. In these tests 15 ml. of lean triethylene glycol, containing 8.3 weight percent of hydrocarbons from the No. 1 dehydrator referred to above, was mixed with 15 ml. of solvent. The mixture was agitated and allowed to settle into a solvent-rich phase and a glycol-rich phase. The glycol-rich phase was analyzed for hydrocarbon and solvent. Results of these analyses, reported in volume percent, are as follows:

TABLE II

| | Solvent Used | | | | |
|---|---|---|---|---|---|
| Component | $C_{10}$—$C_{12}$ Hydrocarbon | Carbon Tetrachloride | Ethyl Ether | UOP Merox | Carbon Disulfide |
| Glycol | 84.6 | 94.2 | 66.4 | 79.1 | 98.7 |
| Hydrocarbon | 15.4 | 4.6 | 6.2 | 18.2 | 1.3 |
| Solvent | Not Determined | 1.2 | 27.4 | 2.7 | None |
| Total | 100.0 | 100.0 | 100.0 | 100.0 | 100.0 |

From the above it will be seen that the $C_{10}$ to $C_{12}$ hydrocarbon fraction and Merox solvent (mixed alkyl disulfides produced in accordance with U.S. Pat. No. 2,549,052) increased the hydrocarbon content of the original glycol solution. Ethyl ether reduced the hydrocarbon content; however, a significant portion of the solvent remained in the glycol, while carbon tetrachloride was much more effective than the Merox solvent or ethyl ether with respect to its ability to extract hydrocarbons from the glycol and at the same time dissolve to a minimum extent in the glycol. The performance of carbon disulfide was obviously superior in this regard.

Additional tests were made to determine the solubility limit of hydrocarbons in $CS_2$. Successive 100 ml. portions of a $C_{10}$-$C_{12}$ hydrocarbon fraction was added to 100 ml. of $CS_2$. Complete miscibility of up to 1,000 ml. of the hydrocarbon fraction in 100 ml. of $CS_2$ was observed. The dilution, however, reduced the specific gravity of the solution from 1.257 (all specific gravities at 25°C, water at 4°C = 1) for pure $CS_2$ to 0.8287 for the mixture of 1,000 ml. of hydrocarbon + 100 ml. of $CS_2$. Six successive extraction steps were made in which the $CS_2$ and hydrocarbon from the previous extraction were reused. The triethylene glycol employed in this work contained 10 percent by volume of hydrocarbon. The procedure employed involved first mixing thoroughly 5 ml. of a $C_{10}$-$C_{12}$ hydrocarbon fraction having a specific gravity of 0.79 with 45 ml. of triethylene glycol (sp. gr. = 1.110). This solution was then added to the $CS_2$-rich phase from the previous run. 50 ml. of $CS_2$, having a specific gravity of 1.257, were used in Run No. 1.

TABLE III

| Run No. | $CS_2$ Phase, ml. | Sp. Gr. | Position | Triethylene Glycol Phase, ml. | Sp. Gr. | Position | Volume % Hydrocarbon Soluble in $CS_2$ |
| --- | --- | --- | --- | --- | --- | --- | --- |
| 1 | 51.0 | 1.208 | Bottom | 49.0 | 1.122 | Top | 2.0 |
| 2 | 52.0 | 1.158 | Bottom | 49.0 | 1.129 | Top | 2.0 |
| 3 | 54.0 | 1.108 | Top | 48.0 | 1.128 | Bottom | 4.0[1] |
| 4 | 56.0 | 1.046 | Top | 48.0 | 1.125 | Bottom | 4.0 |
| 5 | 58.0 | 1.003 | Top | 48.0 | 1.127 | Bottom | 4.0 |
| 6 | 60.0[2] | 0.970 | Top | 48.0 | 1.127 | Bottom | 4.0 |

[1] The $CS_2$ hydrocarbon phase became the lighter phase in the third extraction step and was the upper layer in the separation operation.
[2] The upper limit of $CS_2$ extractive power is unknown. The ability for removing hydrocarbon from glycol became less per unit of extractant, due to progressive dilution with hydrocarbon. In the last step the original 50 ml. of $CS_2$ had extracted 10 ml. of hydrocarbon.

It was noted that at low hydrocarbon concentrations the $CS_2$ was the heavier phase. At about 8 percent hydrocarbon content in the $CS_2$ the glycol, which had an original specific gravity of 1.110, became the heavier phase. This means that the $CS_2$ phase in an operable unit for extraction of hydrocarbon glycol solution should either (1) not be permitted to reach a concentration of about 8 percent hydrocarbon or less and remain the heavier phase or (2) be prediluted above about 8 percent prior to being circulated back to the extraction tower and remain the lighter phase at any higher concentration of hydrocarbon. The $CS_2$ used for hydrocarbon extraction may be discarded after use or regenerated. Regeneration may be affected by distilling and condensing the $CS_2$ and leaving the heavy hydrocarbons which have higher boiling points than the $CS_2$. The residual hydrocarbon stream may be commingled with other plant products and sold.

DESCRIPTION OF DRAWING AND PREFERRED EMBODIMENT OF THE INVENTION

The accompanying flow diagram illustrates a typical gas dehydration unit employing a liquid absorbent for water removal and means for reconcentrating the absorbent prior to returning the latter to the wet gas contactor. Adaptation of the present invention to a conventional gas dehydration unit is demonstrated by taking a slip stream of the regenerated glycol and subjecting it to extraction with $CS_2$ to remove hydrocarbon from the liquid absorbent.

Referring now specifically to the drawing, wet natural gas which contains entrained heavy hydrocarbons is brought in from the field at 100°F and 900 psig through line 2 at the rate of 50 MMSCFD (60°F, 14.65 psia) plus about 3,400 pounds of water vapor and introduced into contactor 4. Lean, dry glycol at 110°F is supplied to the top of contactor 4 through line 6 at the rate of 10 gpm, while dried gas is taken from the system via line 8 at a rate of 50 MMSCFD plus about 350 pounds of water vapor. Rich glycol, containing water and hydrocarbons is withdrawn from the bottom of contactor 4 at a flow rate controlled by level controller 5 by means of line 10, heat exchanged with vaporous effluent from reconcentrator 12, again heat exchanged at 14 with hot regenerated glycol in line 16 and ultimately fed to reconcentrator 12 via line 18, where the rich glycol is regenerated with light hydrocarbon and water taken off via line 25. Reconcentrator 12 is operated at a temperature of about 330°F by the introduction of superheated steam through valved line 22 and coil 24. Hot regenerated glycol is removed from the bottom or reconcentrator 12 by means of line 26 and transferred to line 16 with the use of pump 28.

A contaminated glycol slip stream containing about 10 percent heavy hydrocarbons and flowing at a rate of about 0.4 gpm, is taken from line 17 and introduced into extraction tower 30 via line 32. The incoming stream of regenerated glycol contacts a layer 34 of $CS_2$ containing approximately 8 percent heavy hydrocarbons (enough to give a solution having a specific gravity not in excess of about 1.108 at 25°C, water at 4°C = 1) and passes through layer 34 and into glycol layer 36. Lean glycol free of objectionable amounts of hydrocarbon contaminant is continuously withdrawn by liquid level controller 38 at about 3.5 gpm and taken through lines 40 and 18 to reconcentrator 12, where water is removed therefrom. The $CS_2$ and extracted hydrocarbons are withdrawn as a side stream at a rate controlled by level controller 33 by means of line 42 at about 0.25 gpm and after picking up heat from the hot vaporous overhead from solvent reconcentrator 44 are fed to the latter. The reconcentrator is operated at about 130°F by circulation of hot water through valved line 46 and coil 48, producing an overhead vapor stream (115°F at 15 psia), consisting essentially of $CS_2$ in line 50. This overhead is reduced in temperature to about 90°F in cooler 52 after which it is run into surge tank 54, transferred through line 56 to pump 58, and then returned to tower 30 via line 60 at a rate of about 0.2 gpm. Some hydrocarbon may be present in the purified $CS_2$ stream; however, it may not be sufficient to reduce its specific gravity down to about 1.108, in which case sufficient hydrocarbon, for example from line 62, may be added via line 63 and controlled by valve 61 to adjust the $CS_2$ to the proper density. The hydrocarbon content of this stream may, of course, be in excess of 8 percent. However, in order to maintain the $CS_2$ as the upper layer in extraction tower 30, we have found that it should contain at least 8 percent hydrocarbon.

The heavy hydrocarbon bottoms fraction in reconcentrator 44 is withdrawn from the system through line 62 and, with the exception of that required to adjust the specific gravity of the stream in line 60, may be combined with an appropriate hydrocarbon stream in the plant.

The procedure described above in connection with the accompanying drawing, when applied to a plant of the size referred to in the section of the description relating to the background of the invention, can save the operator approximately 11,000 dollars per year. For example, the glycol stream from the contactor will accumulate about 10 percent heavy hydrocarbons in approximately 4 months' time. An entire unit charge of 23,500 lbs circulates at the rate of 0.4 gpm in about 5 days. Each of two dehydrator systems would require removal of hydrocarbon in accordance with the present invention about every 4 months. During each purification cycle, loss of $CS_2$ to the glycol would be about 250 lbs if the purified glycol in stream 18 contains as much as 1% (wt.) $CS_2$. Annual $CS_2$ loss, which could be rejected along with water from the glycol in the concentrator would amount to about 225 dollars. The quantity of glycol mentioned above and replaced twice each year, if the dehydration units were operated in accordance with the state of the art prior to our entry into the field, is valued at approximately 11,300 dollars. However, with the use of our invention it would be possible to effect a net savings of the order of about 11,000 dollars per year.

It will be apparent that the process of our invention may be adapted to any liquid dehydrating system using a glycol or similar absorbent for water removal — where hydrocarbon accumulation in the absorbent tends to give rise to problems as discussed herein.

We claim:

1. In a process for the removal of a hydrocarbon impurity from a liquid absorbent used to remove water from a gas containing said impurity, the latter having a boiling point such that it can not be separated from said absorbent by means of conventional fractional distillation of water from said absorbent, the improvement which comprises mixing in a contacting zone said liquid absorbent containing said hydrocarbon impurity with a selective solvent selected from the group consisting of $CS_2$ and $CCl_4$, allowing said absorbent and solvent to form separate layers and thereafter withdrawing from said zone a stream of absorbent essentially free from said impurity.

2. The process of claim 1 wherein said rich absorbent contains from about 10 to 18 weight percent hydrocarbon.

3. The process of claim 1 wherein the solvent employed is $CS_2$.

4. The process of claim 1 wherein said process is continued until the hydrocarbon content of said absorbent is not more than about 6 volume percent.

5. The process of claim 1 wherein said solvent contains sufficient hydrocarbon as a contaminant to cause such solvent to constitute the upper layer.

6. The process of claim 1 wherein the absorbent employed is selected from the group consisting of ethylene glycol, diethylene glycol, and triethylene glycol.

7. In a process for the removal of water from a hydrocarbon-containing gas stream, wherein said stream is contacted with a lean liquid absorbent to extract water from said stream and wherein a portion of the hydrocarbon fraction is dissolved in said absorbent, subjecting the resulting rich absorbent to a regeneration step to remove said water, circulating the thus regenerated absorbent back to the above-mentioned contacting step, and repeating the above cycle until the hydrocarbon content of said absorbent accumulates to a concentration such that said absorbent (1) is no longer effective to take up water from said stream, the improvement which comprises contacting said absorbent (1) in an extraction zone with a hydrocarbon solvent selected from the group consisting of $CS_2$ and $CCl_4$, allowing said absorbent (1) and said solvent to form separate layers in said zone and withdrawing from said zone a stream of lean liquid absorbent substantially free of hydrocarbons.

8. The process of claim 7 wherein the hydrocarbon solvent stream employed in the extraction step is $CS_2$ and contains sufficient dissolved hydrocarbon to give said stream a specific gravity not in excess of about 1.1.

9. The process of claim 4 wherein said absorbent stream substantially free of hydrocarbon is returned to the first-mentioned contacting step and used to remove water from said gas stream.

10. The process of claim 7 wherein said cycle is repeated until the hydrocarbon content of said absorbent (1) increases to about 15 to 18 weight percent.

11. The process of claim 7 wherein a minor portion of said absorbent (1) is subjected to extraction with said solvent while the major portion of said absorbent (1) is used to contact said gas stream.

12. The process of claim 7 wherein the absorbent employed is selected from the group consisting of ethylene glycol, diethylene glycol, and triethylene glycol.

\* \* \* \* \*